Patented May 31, 1949

2,471,856

UNITED STATES PATENT OFFICE 2,471,856

LEAK-STOPPING COMPOSITIONS

Craig A. Blair, Hackettstown, N. J., assignor to "X" Laboratories, Inc., New York, N. Y., a corporation of New York No Drawing. Application August 27, 1946, Serial No. 693,387

2 Claims. (Cl. 106—33)

The present invention relates to a leak-stopping composition and more particularly, to a leak-stopping composition for use in boilers, automobile radiators and the like.

Leak-stopping compositions in which gambier or the like comprises the principal constituent are old and well-known. In such compositions fresh gambier is put into colloidal solution in water or a mixture of water and alcohol. Such compositions are added to the boiler or other water vessel and the finely-divided particles thereof will congregate at and adhere to the edges of any leak openings in such vessel. The gambier has the property of slowly hardening into a relatively insoluble body when exposed to air and thus the particles thereof congregated at a leak opening eventually will be effective to seal the opening.

It has been an object of the present invention to provide a leak-stopping composition which operates in generally the same manner as those compositions containing gambier or the like but which is much more rapidly effective, produces a seal of more permanent nature and will remain potentially available for sealing new leaks as they may be developed much longer than the previously known compositions. A further object has been to provide such a composition which is formed of ingredients that are more readily available and less expensive than gambier.

The principal feature of the present invention lies in the use of certain materials present in spent tanning liquor. Preferably these materials are those in the spent liquor from tanning operations in which a mixture of quebracho, chestnut, mangrove, myrobalans and divi-divi has been used. I have discovered that a colloidal suspension of the residue of these substances remaining after a tanning operation used with or without a quantity of finely-divided fibrous material, such as asbestos, is even more effective than the gambier compositions previously used. The new composition may be supplied to the user in concentrated liquid form or as a mixture of the dry ingredients which the user may add directly to the vessel to be treated or which he may preliminarily mix with water or water and alcohol.

Waste liquor from tanning operations may be readily and economically obtained in the market. For convenience in handling, the waste liquor may be dried and powdered. One available dehydrated waste tanning liquor contains the spent products from a fresh tanning liquor consisting principally of quebracho and chestnut and containing smaller amounts of one or more of the following: mangrove bark, wattle bark, myrobalans, divi-divi, valonia, oak bark and hemlock bark.

The dehydrated material described in the preceding paragraph may be mixed in dry form with a suitable quantity of finely-divided fibrous material, such as asbestos, and supplied to the user as a dry product.

Alternatively the dehydrated material may be stirred into warm or hot water until dispersion is substantially complete. The fibrous material, such as asbestos, may be added to the suspension and thoroughly mixed therewith after which the mixture is cooled and a suitable quantity of alcohol is added. The resulting liquid product may be supplied to the user in any suitable container.

Specific examples of the preparation and formulation of a dry and a liquid leak-stopping composition embodying the present invention will now be given.

*Example 1.*—For a dry product one and one-half ounces of finely ground asbestos may be added to one pound of a dry powder consisting of the materials resulting from the evaporation of the liquid of spent tanning liquor from a tanning operation in which the fresh liquor has as its principal constituents quebracho and chestnut, which comprise the major part of the liquor, and smaller amounts of mangrove, myrobalans and divi-divi. The constituents are thoroughly mixed as by screening or other desired dry mixing procedure and the product is ready for packaging and sale.

*Example 2.*—For a five-hundred pound batch of a liquid product the following quantities of materials may be used:

Dry, powdered waste tanning liquor as in
Example 1 _____pounds__ 167.5
Water _____gallons__ 27
Alcohol _____do____ 12
Asbestos _____pounds__ 22.5

The powdered waste liquor is slowly stirred into the water which has previously been heated to 150° F. to 180° F. When dispersion is complete the asbestos is added in finely ground form and stirring is continued until thorough distribution is obtained. The mixture is cooled to about 90° F. to 100° F. and the alcohol is then added and thoroughly stirred or otherwise mixed. The product is then ready to be packaged and sold for use.

For the liquid product the waste tanning liquor need not be supplied as a dry powder. For example, it may be convenient to use the liquor as it is recovered at a tannery in which event the product may be more dilute than that of Example 2. Furthermore, the waste liquor may be concentrated by evaporation to a desirable consistency and mixed with the other constituents.

The products resulting from either of the specific examples or the suggested modifications thereof may be added directly to the boiler, cooling system or other water vessel. In the case of the dry product under Example 1, it may be preferred to add a suitable quantity of water or a mixture of water and alcohol and to stir the mixture thoroughly before adding the same to the vessel to be treated. The action of either product is substantially the same although in certain instances the action of the product in sealing leaks may be slower if the alcohol is omitted.

In the treatment of an automobile radiator of average passenger-car size approximately one-half pint of the liquid product of Example 2 should be added. In the treatment of a hot-water heating system for an average seven-room house approximately one-half gallon of the liquid product of Example 2 should be added. In either case a larger quantity may be used if the leaks are unusually severe inasmuch as there is no danger of the product clogging or otherwise adversely affecting the cooling or heating system in which it is used. Approximately two and one-half ounces of the dry product in Example 1 is equivalent to one pint of the liquid product of Example 2.

It is important that the temperature of the water in the vessel to be treated be elevated to a point just below boiling and that the level of the water in the vessel be high enough to assure that the suspension will reach all leaks. In the treatment of an automobile radiator, for example, the radiator should be filled within about six inches of the top and the engine should be run at idling speed with the radiator covered for a sufficient period of time to assure that the entire system is at a temperature as near to boiling as is practicable. The product of the present invention is then added and the temperature maintained by continued running of the engine for several minutes or until all leaks have been stopped. The product may be left in the radiator for the sealing of such leaks as may tend to develop in continued operation of the automobile. Similarly a household heating system should be vigorously fired before addition of the product and for a period of time after such addition to assure rapid and effective sealing of leaks therein.

The finely ground asbestos or other fibrous material is an important although not indispensible constituent. The function of the asbestos is to assist in the congregation of the particles in colloidal suspension at a leak opening and to assist in retaining such particles in contact with the air for a period of time long enough to permit hardening. The mixture of spent quebracho, chestnut, mangrove, myrobalans and divi-divi has the peculiar characteristic of hardening at a very rapid rate upon exposure to air and the hardening rate is much more rapid than that of gambier and other similar materials heretofore used in leak-stopping compounds. The seal formed at a leak is more permanent in that it resists moisture and vibration more effectively than the seals formed by the materials heretofore used.

In addition to its effectiveness as a leak-stopping composition, the composition of the present invention has been found to form a colloidal film on the interior surfaces of the vessel in which it is used. The film thus formed is not of the type which progressively builds up as a gummy layer which eventually may require removal but rather is of the type which remains very thin. This means that the film will retard the formation of scale or other deposits without itself becoming objectionable. One particularly beneficial result of this characteristic is that the leak-stopping composition of the present invention may be added to an automobile radiator, boiler or the like to repair existing leaks or before any leaks have developed and will remain potentially available to repair future developed leaks. In the meantime the composition will be highly effective to prevent scaling, rusting and the like.

The particular quantities of water or water and alcohol set forth in Example 2 have been found to give the liquid product a desirable consistency. It will be understood that within reasonable limits the quantity of liquids may be varied to give a product of higher or lower concentration as might be desired.

I claim:

1. A leak stopping composition for water-containing vessels including a quantity of finely divided fibrous material intimately mixed with a substantially greater quantity of the waste liquor from tanning operations in which quebracho, chestnut, mangrove, myrobalans and divi-divi have been used.

2. A leak-stopping composition for water-containing vessels including a quantity of finely divided fibrous material intimately mixed with a substantially greater quantity of the waste liquor for tanning operations in which there has been used a tanning liquor consisting principally of quebracho and chestnut and containing smaller amounts of at least one of the materials selected from the group consisting of mangrove bark, wattle bark, myrobalans, divi-divi, valonia, oak bark and hemlock bark.

CRAIG A. BLAIR.

REFERENCES CITED

The following references are of record in the file of this patent:

UNITED STATES PATENTS

| Number | Name | Date |
|---|---|---|
| 1,171,905 | Tompkins | Feb. 15, 1916 |
| 1,413,524 | Dolan | Apr. 18, 1922 |
| 2,241,963 | Rosenthal | May 13, 1941 |
| 2,391,737 | Pabst | Dec. 25, 1945 |

FOREIGN PATENTS

| Number | Country | Date |
|---|---|---|
| 132,088 | Great Britain | 1919 |
| 185,114 | Great Britain | 1923 |

Certificate of Correction

May 31, 1949.

Patent No. 2,471,856.

CRAIG A. BLAIR

It is hereby certified that error appears in the printed specification of the above numbered patent requiring correction as follows:

Column 4, line 45, for the words "for tanning" read *from tanning*; and that the said Letters Patent should be read with this correction therein that the same may conform to the record of the case in the Patent Office.

Signed and sealed this 8th day of November, A. D. 1949.

[SEAL]

THOMAS F. MURPHY,
*Assistant Commissioner of Patents.*